W. H. APPLEBY.
STEERING WHEEL.
APPLICATION FILED FEB. 21, 1916.

1,201,792.

Patented Oct. 17, 1916.
2 SHEETS—SHEET 1.

Inventor.
William H. Appleby
by Cheever & Cox
Attys.

W. H. APPLEBY.
STEERING WHEEL.
APPLICATION FILED FEB. 21, 1916.

1,201,792.

Patented Oct. 17, 1916.
2 SHEETS—SHEET 2.

Inventor:
William H. Appleby,
by Cheever & Cox
Attys.

UNITED STATES PATENT OFFICE.

WILLIAM H. APPLEBY, OF CHICAGO, ILLINOIS.

STEERING-WHEEL.

1,201,792.  Specification of Letters Patent.  Patented Oct. 17, 1916.

Application filed February 21, 1916. Serial No. 79,486.

*To all whom it may concern:*

Be it known that I, WILLIAM H. APPLEBY, a subject of the King of Great Britain, residing at Chicago, in the county of Cook and State of Illinois, have invented a certain new and useful Improvement in Steering-Wheels, of which the following is a specification.

My invention relates to steering wheels, and the object of the invention is to provide a wheel which is readily attachable to and detachable from a steering head or block by moving the wheel in a direction perpendicular to the plane of the wheel, the wheel being removed by dropping it downward and thereby disengaging it.

It is my purpose in carrying out the invention in its broadest aspect, to provide a construction such that the connection between the wheel and the steering block shall be very firm and rigid and prevent any lost motion between the wheel and the block when the wheel is in position.

It is also my purpose to provide automatic locking means by which the wheel may become automatically locked to the steering block by simply moving it up into engagement therewith.

Other contributing characteristics will be indicated in the following description.

I accomplish my objects by the mechanism illustrated in the accompanying drawings, in which—

Figure 1:
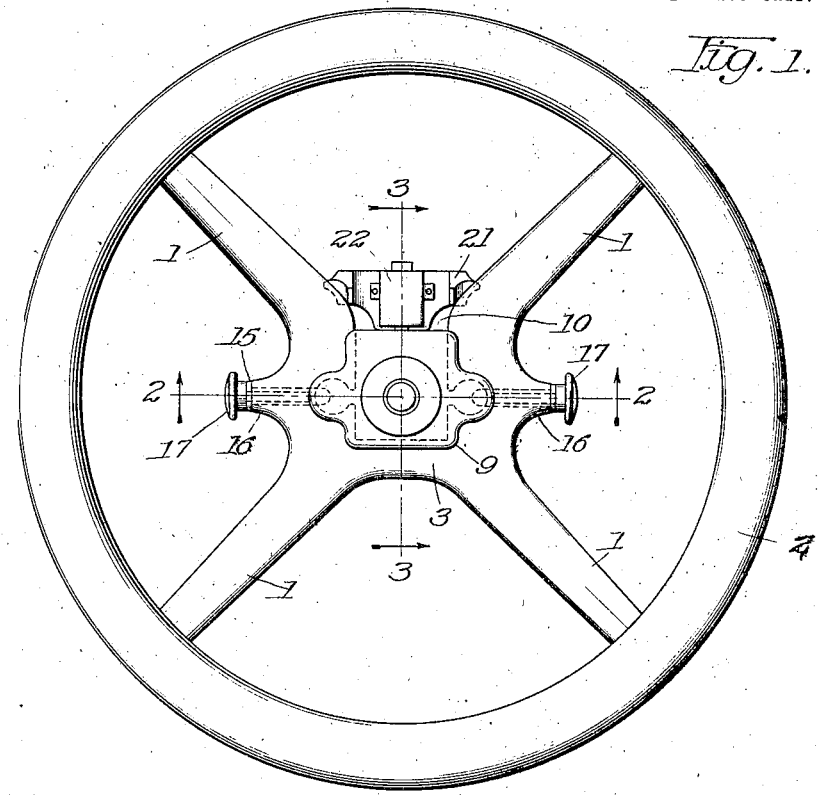
Figure 2:
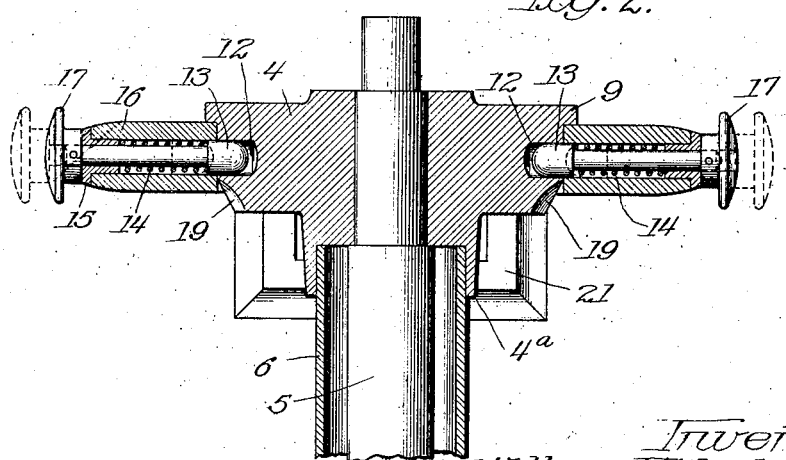
Figure 3:
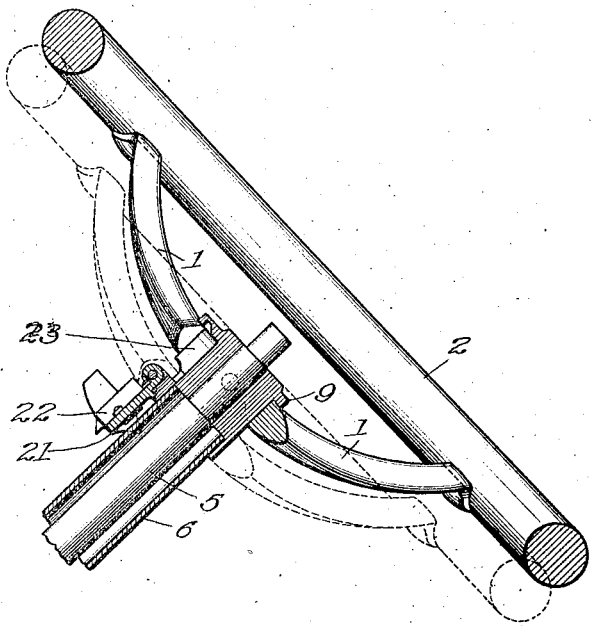
Figure 4:
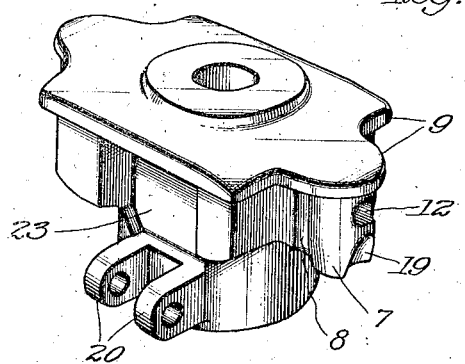

Figure 1 is a top view of a steering wheel and block embodying my invention. Fig. 2 is a sectional view on the line 2—2, Fig. 1. Fig. 3 is a sectional view on the line 3—3, Fig. 1, and Fig. 4 is a perspective view of the steering block from which the obstructer bar or lock-out has been removed.

This obstructing element is not herein claimed, as it is shown and claimed in my previous application, Serial Number 63,410, filed November 26th, 1915, and allowed January 31st, 1916.

Similar numerals refer to similar parts throughout the several views.

The wheel has a plurality of arms 1 which carry a rim 2 at their outer ends in the usual manner. The hub 3 which in the form illustrated is cast integral with the arms, has an opening at the center for receiving the steering block 4. This block is designed to be rigidly attached to the steering post of the vehicle. With respect to the steering post, I have, for the purpose of illustration, selected a type now in common use, the same being best shown in Figs. 2 and 3. In the form here illustrated, the steering post or spindle 5 is inclosed within a tubular standard 6, the latter being stationary and loosely fitting up into the circular flange 4$^a$ depending from the block. The steering post extends up through the block and will usually be constructed of tubing so as to accomodate the ordinary central rod (not shown). In my design there is no obstruction above the top of the block and hence space is afforded for the control lever and quadrant which are not here shown as they are well known in the art.

In the preferred form the steering block, when viewed from the top, is approximately rectangular in outline, but is provided at its opposite ends with lugs 7. These lugs, in the best form, are cast integral with the steering block and are cylindrical in general configuration, except where connected through necks 8 to the body of the block itself. These lugs are arranged with their axes parallel to the axis of the steering post. In the preferred construction, the steering block has a peripheral flange 9 at the top which forms a cap integral with the body of the block. The hub is open at one side, as at 10, and this communicates with an aperture in the center of the hub which is so configurated as to fit the sides of the block preferably throughout almost the entire lateral surface thereof. The cap on the block performs the function of covering the surfaces of contact between the block and the hub, and also serves as a stop to limit the upward movement of the wheel relatively to the block.

The end surfaces of the lugs 7 have sockets 12 for receiving the inner ends of the spring pins 13 carried by the hub. The preferred construction of these pins is best shown in Fig. 2 where it will be seen that the shank of the pin is of reduced diameter and is encircled by a helical spring 14 which, at one end, engages the pin and at the other end is backed up by a bushing 15 fastened at the outer end of each of the bosses 16. These bosses are preferably integral with the hub of the wheel. The spring pins are provided with heads 17 at their outer ends which afford means whereby the operator may retract the pins from their sockets in the steering block. At the bottom of each of the lugs 7 is a beveled surface 19 adapted to engage the rounded inner end of the pin and to act upon the pin according to the nature of a cam to automatically force the pin outward against the tension of its spring when the wheel is being moved upward upon the block.

As pointed out in my above mentioned copending application, it is desirable in many instances to provide a lock-out or obstructing element which may be locked to the side of the steering block after the wheel has been removed in order to prevent an unauthorized person from providing himself with a steering wheel of similar construction and using it to aid him in making away with the vehicle. This lock-out may or may not be used upon the mechanism which forms the subject of this present application, but I have chosen to illustrate the mechanism in one of the forms which it will assume when the lock-out is present. In this design, the steering post is provided at the side with lugs 20 to which is pivoted a lock-out or obstructer bar 21. This lock-out, when in acting position, hugs the sides of the block and prevents any steering wheel from being applied so long as the lock-out is in acting position. In the form illustrated the lock-out is provided with a lock 22 of any suitable design,—this lock being adapted to enter the recess 23 provided for its accommodation in the side of the block.

In operation, when the vehicle is in use, the parts will be assembled as illustrated in Fig. 1. When the vehicle owner intends to leave the vehicle for any considerable period of time and wishes to render it inoperative during his absence, he retracts the spring pins from their sockets in the steering block. This permits him to drop the wheel to the dotted position shown in Fig. 3. When this position has been reached the wheel is free from the steering block and may then be entirely removed from the vehicle. After this, if the lock-out is employed, the owner swings the lock-out up along side of the steering block and causes the same to engage the block. After this has been done, no similar wheel can be applied to the vehicle without first unlocking the lock-out. When the owner returns and wishes to apply the wheel, he unlocks the lock-out and swings it down to the non-acting position shown in the drawings. He then brings the wheel to the dotted position of Fig. 3. He then raises the wheel in a direction parallel to the axis, causing the inner ends of the spring pins to engage the cam surfaces 19 and by them to be forced outward sufficiently to enable them to finally snap into the sockets 12 provided in the sides of the lugs 7.

It will be evident that engagement of the spring pins with the steering block is automatic and requires no attention on the part of the operator. As soon as the pins have entered the sockets in the steering block the wheel will be securely fastened to the block but the strain incident to steering the vehicle,—that is, the strain due to the rotary movement of the wheel, will not exert a shearing stress upon the pins. The stress and strain will be borne by the lugs 7 which are of ample dimensions, and the strength of the lugs is not dependent alone upon the necks 8, for in the preferred design, the outline of the cap 9 does not follow strictly the outline of the block, but is of extra width at this point. In other words, the cap in addition to its other functions acts as a reinforcing web to enhance the strength of the structure, especially at the neck of the lugs.

I claim as my invention:

1. In combination, a steering post having a steering block fastened thereto, and a readily detachable steering wheel having a hub with an opening in its side, the hub having a central aperture fitting the block, and the block and the hub having coöperating guide surfaces arranged parallel to the axis of the post whereby the wheel may be moved in an axial direction relatively to the block, but is prevented from being moved transversely to the axis.

2. In combination, a steering post having a steering block fastened thereto, a readily detachable steering wheel having a hub with an opening in its side, the hub having a central aperture fitting the block, and guides arranged parallel to the axis of the post for permitting relative movement between the hub and the block in an axial direction and for preventing relative movement in a direction transverse to said axis.

3. In combination, a steering post having a steering block fastened thereto, a readily detachable steering wheel having a hub with an opening in its side, the hub having a central aperture fitting the block, guides arranged parallel to the axis of the post for permitting relative movement between the hub and the block in an axial direction and for preventing relative movement in a direction transverse to said axis, and a stop on the block for preventing the wheel from being lifted off over the top of the block.

4. A vehicular steering post having a steering block fastened to it, said block having lugs on the side arranged parallel to the axis of the post, in combination with a steering wheel having a hub, open at the side, and with a central aperture into which the block fits, and a cap at the top of the block extending out over the inner margin of the hub.

5. A vehicular steering post having a steering block fastened to it, said block having lugs on the side arranged parallel to the axis of the post, in combination with a steering wheel having a hub, open at the side, and with a central aperture into which the block fits, a stop on the block for preventing the removal of the hub up over the block, and releasable locking means for preventing the hub from slipping downward relatively to the block.

6. A vehicular steering post having a steering block fastened to it, said block having lugs on the side arranged parallel to the axis of the post, in combination with a steering wheel having a hub, open at the side, and with a central aperture into which the block fits, and a snap lock for automatically locking the hub to the block when the parts have reached the proper relative position.

7. A vehicular steering post having a steering block fastened to it, said block having lugs on the side arranged parallel to the axis of the post, in combination with a steering wheel having a hub, open at the side, and with a central aperture into which the block fits, a projecting cap at the top of the block for limiting the upward movement of the hub relatively to the block, and snap locks on opposite sides of the hub for automatically engaging the block when the hub is moved upward along the block and into contact with the cap.

8. A steering post for a motor vehicle, and a steering block fastened to the upper end thereof; in combination with a steering wheel having a hub with a central opening into which the block fits, said block having at the sides substantially cylindrical lugs each connected by a neck to the block and arranged parallel to the axis of the steering post, and spring pins in said hub constantly urged toward said block, said block having sockets in the side for receiving the inner ends of said pins and the block having cam surfaces beneath said sockets for causing said pins to ride over the lower part of the block and automatically enter said sockets as the wheel is moved upward relatively to the block.

In witness whereof, I have hereunto subscribed my name.

WILLIAM H. APPLEBY.